United States Patent
Vannoni et al.

(10) Patent No.: US 12,125,094 B2
(45) Date of Patent: Oct. 22, 2024

(54) MIGRATION OF ELECTRONIC SHOPPING CARTS BETWEEN DEVICES

(71) Applicant: PAYPAL, INC., San Jose, CA (US)

(72) Inventors: Greg Anthony Vannoni, Phoenix, AZ (US); Joshua Buck Powers, Chandler, AZ (US); Aaron Whitfield Ross, Phoenix, AZ (US); Jon William Axelson, Fountain Hills, AZ (US); Nicolle Elise Mathews, Maricopa, AZ (US); William Richardson, Phoenix, AZ (US); Harsh Rajesh Vachhani, Scottsdale, AZ (US); Atul Sanjeev Rai, Tempe, AZ (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 18/192,570

(22) Filed: Mar. 29, 2023

(65) Prior Publication Data

US 2023/0237557 A1 Jul. 27, 2023

Related U.S. Application Data

(63) Continuation of application No. 16/926,426, filed on Jul. 10, 2020, now Pat. No. 11,625,763.

(51) Int. Cl.
*G06Q 30/00* (2023.01)
*G06Q 30/0601* (2023.01)
*G06Q 30/08* (2012.01)

(52) U.S. Cl.
CPC ......... *G06Q 30/0633* (2013.01); *G06Q 30/08* (2013.01)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS 8,438,052 B1 * 5/2013 Chanda ............ G06Q 30/0207
705/7.11
10,127,599 B2 * 11/2018 Maenpaa ........... G06Q 30/0633
(Continued)

FOREIGN PATENT DOCUMENTS

WO 2013158394 A1 10/2013

OTHER PUBLICATIONS

Hellsten, Christian, and Jarkko Laine. "Shopping Cart Implementation." Beginning Ruby on Rails E-Commerce: From Novice to Professional (2007): 141-168. (Year: 2007).*

(Continued)

*Primary Examiner* — Christopher B Seibert
(74) *Attorney, Agent, or Firm* — .Haynes and Boone, LLP

(57) ABSTRACT

Methods and systems are presented for facilitating migration of electronic shopping carts between devices. A user generates an electronic shopping cart based on interacting with a merchant website using a first device. In response to receiving a request for transferring the electronic shopping cart, cart data associated with the electronic shopping cart is obtained. The cart data is encoded, using a selected encoding technique, into a code, which can be a phrase, an emoji string, a QR code, or an image of a face that can be transferrable to a second device. The code is presented on the first device. In response to receiving the code from the second device, the electronic shopping cart is re-generated based on the cart data extracted from the code. The electronic shopping cart is made accessible to the user via the second device.

20 Claims, 9 Drawing Sheets

(56) References Cited

U.S. PATENT DOCUMENTS

| | | | | |
|---|---|---|---|---|
| 2002/0038255 | A1* | 3/2002 | Tarvydas | G06Q 30/0625 |
| | | | | 705/26.43 |
| 2006/0041485 | A1* | 2/2006 | Tarvydas | G06Q 30/0623 |
| | | | | 705/26.62 |
| 2006/0059099 | A1* | 3/2006 | Ronning | G06Q 20/1235 |
| | | | | 705/59 |
| 2007/0043626 | A1* | 2/2007 | Duvall | G06Q 30/0603 |
| | | | | 705/26.8 |
| 2010/0042515 | A1* | 2/2010 | Crespo | G06Q 30/0605 |
| | | | | 715/764 |
| 2010/0185514 | A1* | 7/2010 | Glazer | G06Q 30/0253 |
| | | | | 715/848 |
| 2012/0226573 | A1* | 9/2012 | Zakas | G06Q 30/0601 |
| | | | | 705/26.7 |
| 2012/0323682 | A1* | 12/2012 | Shanbhag | G06Q 30/0641 |
| | | | | 705/14.66 |
| 2013/0290172 | A1* | 10/2013 | Mashinsky | G06Q 20/28 |
| | | | | 705/39 |
| 2014/0052571 | A1* | 2/2014 | Raman | G06Q 30/0633 |
| | | | | 705/26.8 |
| 2014/0122203 | A1* | 5/2014 | Johnson | G06Q 30/0633 |
| | | | | 705/26.8 |
| 2014/0175167 | A1* | 6/2014 | Argue | G06Q 30/0633 |
| | | | | 235/383 |
| 2015/0169624 | A1* | 6/2015 | Gupta | G06F 16/951 |
| | | | | 707/610 |
| 2016/0171540 | A1* | 6/2016 | Mangipudi | G06Q 30/0255 |
| | | | | 705/14.53 |
| 2016/0173540 | A1 | 6/2016 | Linden et al. | |
| 2016/0210674 | A1 | 7/2016 | Allen et al. | |
| 2018/0137557 | A1 | 5/2018 | Vadher et al. | |
| 2018/0240088 | A1 | 8/2018 | Nelms et al. | |
| 2020/0402033 | A1 | 12/2020 | Sivan et al. | |

OTHER PUBLICATIONS

International Preliminary Report on Patentability for Application No. PCT/US2021/039893 mailed on Jan. 19, 2023, 10 pages.

International Search Report and Written Opinion for Application No. PCT/US2021/039893 mailed on Oct. 25, 2021, 11 pages.

Jin C., et al., "Source Smartphone Identification by Exploiting Encoding Characteristics of Recorded Speech," Digital Investigation, 2019, vol. 29, pp. 129-146.

Viswanadha V., et al., "Smart Shopping Cart," International Conference on Circuits and Systems in Digital Enterprise Technology (ICCSDET), 2018, 4 pages.

* cited by examiner

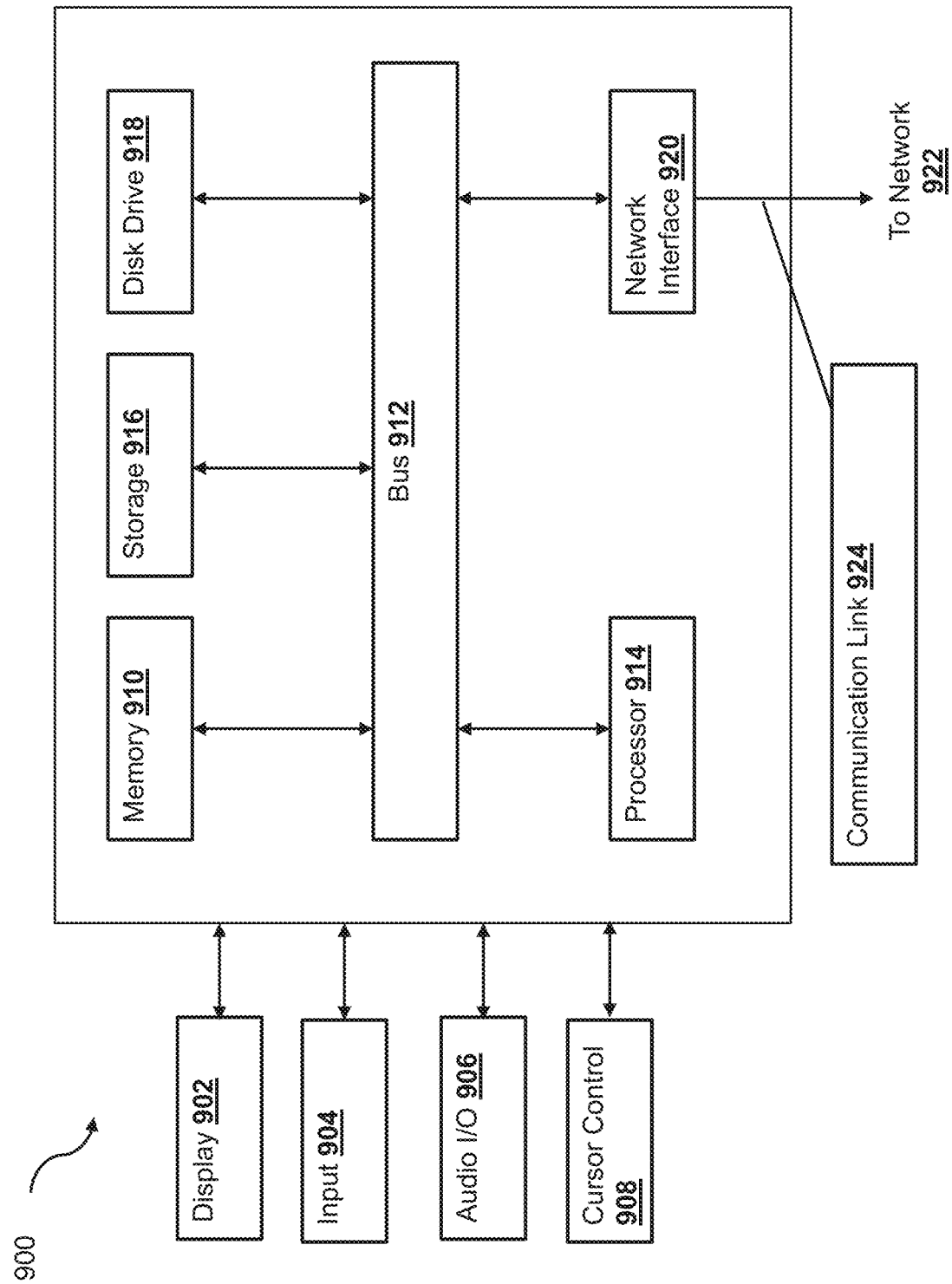

MIGRATION OF ELECTRONIC SHOPPING CARTS BETWEEN DEVICES

CROSS REFERENCE TO RELATED APPLICATION

The present invention is a Continuation of U.S. patent application Ser. No. 16/926,426, filed Jul. 10, 2020, which is incorporated herein by reference in its entirety.

BACKGROUND

The present specification generally relates to online data processing platforms, and more specifically, to facilitating migration of electronic shopping carts from online data processing platforms between different computing devices according to various embodiments of the disclosure.

RELATED ART

Different online data processing platforms, such as online websites and apps for different merchants, usually provide an electronic shopping cart to hold item(s) selected by a user prior to completing an online purchase transaction. When the user is ready to checkout, the merchant website may perform an online purchase transaction based on the item(s) in the electronic shopping cart of the user. Typically, during a checkout process, the merchant website may obtain information from the user, such as a name, a shipping address, a billing address, funding account information (e.g., credit card number, etc.), and other information necessary for completing the online purchase transaction. Alternatively, if the user has an account with the merchant website that contains the necessary information for completing the online purchase transaction, the user may opt to log in to the account by providing credential data (e.g., user name, password, etc.) to the merchant website.

However, depending on the device used by the user to browse the merchant website, the user may not feel comfortable inputting such information on the device. For example, the device may be a public device shared by different people or a device that the user borrowed from another person. The user may, instead, prefer to perform the online purchase transaction via a trusted device such as a device associated with the user. Conventionally, in order for the user to perform the purchase transaction using the trusted device, the user is required to use the trusted device to re-access the merchant website and then manually search and add the items again to a new electronic shopping cart via the trusted device, which can be burdensome and time consuming. Thus, there is a need for an efficient way to migrate electronic shopping carts between devices.

BRIEF DESCRIPTION OF THE FIGURES

FIG. 9 is a block diagram of a system for implementing a device according to an embodiment of the present disclosure.

Figure 1:
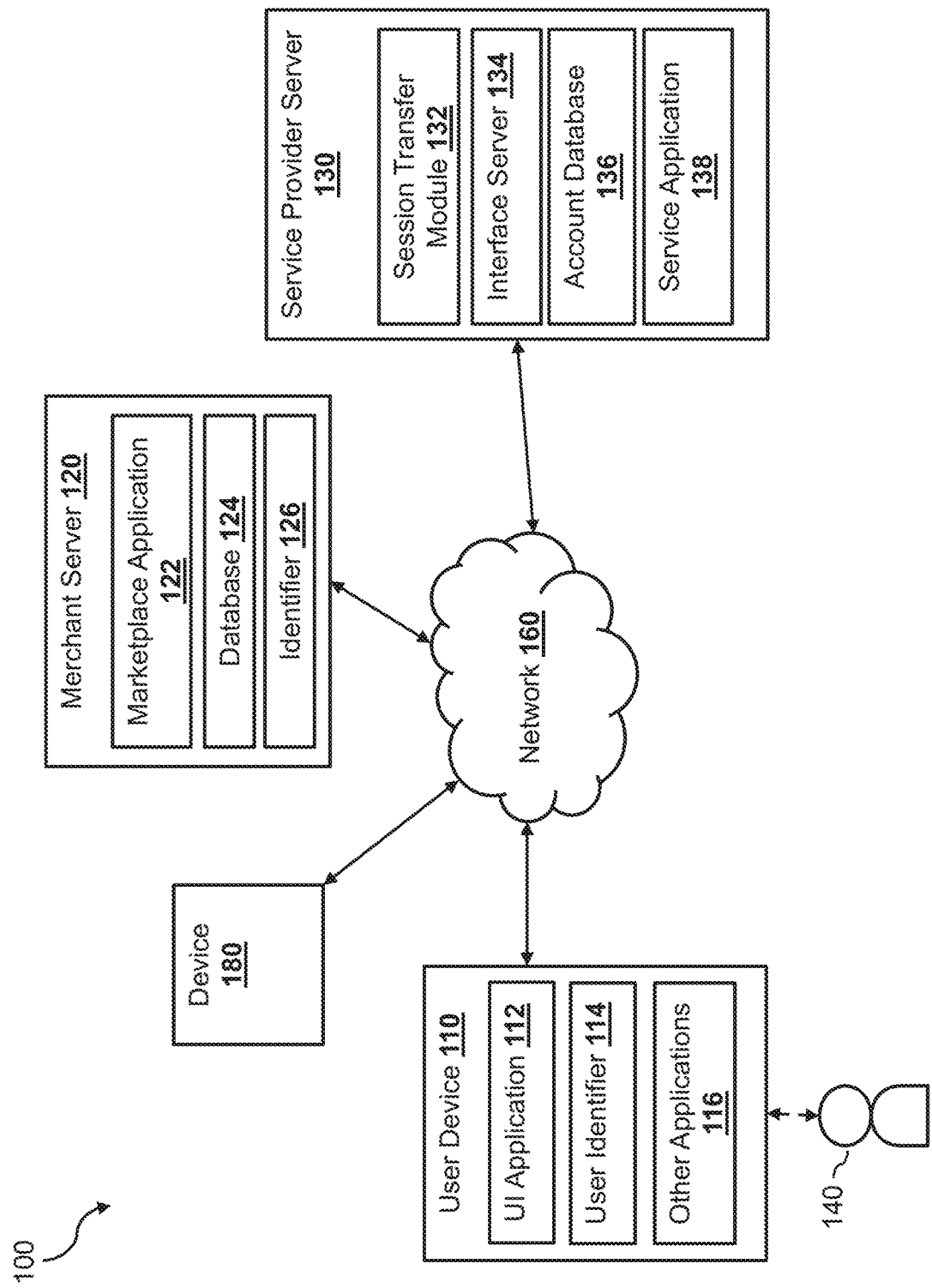
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for facilitating migration of electronic shopping carts between devices. As discussed above, a user may have generated an electronic shopping cart associated with a merchant website using a first device. The first device may be an untrusted device, such as a shared computer device at a public location (e.g., a library, an office, a café, etc.) or a device that is not under the control of the user (e.g., a device borrowed from another person). The user may use the first device to interact with the merchant website, such as viewing items displayed on the merchant website, searching and selecting purchasable items or content from the merchant website, inputting preferences, etc. During the user's interactions with the merchant website using the first device, the user may select and add one or more items to an electronic shopping cart associated with the merchant website.

In some embodiments, the electronic shopping cart may be implemented as a software object having a particular data structure for storing information. The information stored within the electronic shopping cart object may include a cart identifier for identifying the electronic shopping cart. The information may also include data associated with the one or more items selected by the user to be included in the electronic shopping cart, such as names of the one or more items, identifiers (e.g., a product code) associated with the one or more items, a quantity of each of the one or more items, a price of each of the one or more items, and other information associated with the items. In some embodiments, the information stored within the electronic shopping cart may also include additional data such as policy data indicating a set of policies governing the sales of the one or more items included in the electronic shopping cart.

The information stored within the electronic shopping cart may be used by the merchant website to process an online purchase transaction for the user. For example, when the user initiates a checkout process with the merchant website (e.g., selecting a "checkout" button on the merchant website), the merchant website may process the online purchase transaction for the user based on the information stored in the electronic shopping cart. The merchant website may prompt the user for additional information to complete the online purchase transaction, such as funding account information (e.g., a credit card number), a billing address, a shipping address, a shipping method, and other information necessary for completing the online purchase transaction. In some embodiments where the user has an account with the merchant website, the user may log in to the account by providing credential data (e.g., a user name, a password, etc.) to access the funding account information stored with the account.

However, the user may desire to use a second device to perform the online purchase transaction for the items in the electronic shopping cart that was generated using the first device. For example, the user may not feel comfortable inputting the financial data, personal data, or credential data into an untrusted device that is either shared with other people or otherwise is not under the control of the user. The user may also have a digital wallet application installed on the second device such that the user may want to use the digital wallet application to facilitate payment for the online purchase transaction. Other reasons may include the first device having connectivity issues or running low on battery power.

In some embodiments, the electronic shopping cart is configured to temporarily store selected items during a browsing session for an online purchase. The browsing session between the first device and a merchant server that hosts the merchant website may be established when the user initially accesses the merchant website via the first device. The user may browse and add items to the electronic shopping cart during the browsing session. The merchant server may be configured to discard the electronic shopping cart when the browsing session is terminated (e.g., upon detecting a session termination event). For example, the session termination event may include the user closing a display window that displays the merchant website on the first device, the user terminating the browser application that displays the merchant website, and the merchant website displaying on the untrusted device timing out (e.g., the merchant website being inactive for a predetermine amount of time). When the browsing session is terminated, the merchant server may discard the electronic shopping cart such that the user may no longer access information associated with the electronic shopping cart. Since the electronic shopping cart is linked to the browsing session, conventionally, the user may not be able to access the electronic shopping cart using the second device that is different from that first device that was used to generate the electronic shopping cart. As a result, the user may not be able to perform the online purchase transaction based on the electronic shopping cart using the second device. Instead, in order for the user to purchase the one or more items in the electronic shopping cart, the user may have to use a browser application on the second device to browse the merchant website, manually search and add the one or more items to a new electronic shopping cart, and initiate an online purchase transaction based on the new electronic shopping cart, which can be burdensome and time consuming for the user.

Thus, according to various embodiments of the disclosure, a session transfer system may facilitate migration of an electronic shopping cart between devices such that a user who generates an electronic shopping cart using a first device may subsequently access, and initiates an online purchase transaction based on the electronic shopping cart using a second device. In some embodiments, the session transfer system may detect that the user has generated an electronic shopping cart associated with a merchant website. A part of the session transfer system may be implemented as a module (e.g., a plug-in to a web browser, a module of the merchant website, etc.). Based on the detection, the session transfer system may provide a session transfer selectable element on the merchant website for initiating a migration of an electronic shopping cart.

In some embodiments, the session transfer system may provide the session transfer selectable element on a checkout webpage of the merchant website. For example, the user may initiate a checkout process by selecting a "checkout button" on the merchant website displayed on the first device. The merchant website may present the checkout webpage on the first device as a response to the user's initiating the checkout process. The checkout webpage may present information associated with the electronic shopping cart generated by the user (e.g., descriptions and prices of the one or more items that the user added to the electronic shopping cart) as well as payment options (e.g., credit card options, third-party payment provider options, etc.). As discussed herein, by selecting any one of the payment options, the user may be prompted to provide funding account information (e.g., credit card information) and/or credential data (e.g., credentials such as username and password for logging in to an account with the merchant website or the third-party payment provider). As such, the session transfer system may present the session transfer selectable element on the checkout webpage such that the user may migrate the electronic shopping cart to a second device to enable the user to perform the online purchase transaction based on the electronic shopping cart using the second device. In some embodiments, the session transfer system may present the session transfer selectable element on any webpage associated with the merchant website. For example, the session transfer selectable element may be presented on a tool bar of the merchant website such that the user can initiate a migration of the electronic shopping cart at any time while interacting with the merchant website.

Upon receiving a selection of the session transfer selectable element, the session transfer system may generate a code representing the electronic shopping cart. In some embodiments, the session transfer system may first obtain data related to the electronic shopping cart. For example, the session transfer system may retrieve, through an application programming interface (API) from the merchant website, data stored in the data structure associated with the electronic shopping cart, such as merchandise data associated with the one or more items included in the electronic shopping cart (e.g., product identifiers for identifying the one or more items with the merchant website, product descriptions associated with the one or more items, a quantity for each of the one or more items, a price associated with the one or more items, etc.), policy data indicating a set of policies governing the sales of the one or more items, etc. In some embodiments, the session transfer system may also retrieve, through an application programming interface (API) from the merchant website, session data associated with a browsing session during which the electronic shopping cart was generated.

The browsing session may begin when the user initially accesses the merchant website using the first device, and may end when the user completed the online purchase transaction or when one of the session termination conditions is detected. As discussed herein, the electronic shopping cart may be linked to the browsing session, such that the electronic shopping cart may store item(s) that the user has selected during the browsing session. The merchant server may record session data associated with the user's interaction with the merchant website during the browsing session. The session data may represent the way that the user interacts with the merchant website, such as one or more webpages (e.g., product pages) associated with the merchant website that the user visited, a time duration of the user accessing the one or more webpages, elements within the one or more webpages (e.g., photo links, detailed description links, etc.) that the user interacts with, options and/or preferences (e.g., sizes, colors, shipping methods, etc.) that the user indicated to the merchant website, etc.

In some embodiments, the session transfer system may encode the data associated with the electronic shopping cart and session data associated with the browsing session during which the electronic shopping cart was generated. Having the session data in addition to the cart data to be encoded into the code allows the session transfer system to subsequently re-create the electronic shopping cart to be displayed on the second device within a re-generated browsing session between the second device and the merchant server that mimics the browsing session between the first device and the merchant server during which the electronic shopping cart was generated. The regeneration of the browsing session using the session data provides an experience to the user as if the user continues the browsing session using the second device.

Different embodiments of the session transfer system may use different techniques in encoding the electronic shopping cart. In some embodiments, the session transfer system may encode the electronic shopping cart into a string of characters (e.g., a short phrase). For example, the session transfer system may convert the data (e.g., shopping cart data and session data, etc.) into a sequence of numbers, and then convert the sequence of numbers into a sequence of letters. In some embodiments, the sequence of numbers may be converted into the sequence of letters based on ASCII coding (e.g., reverse ASCII coding).

In some embodiments, the session transfer system may generate a short phrase based on the sequence of numbers (or the sequence of letters) using a long short term memory (LSTM) neural network. For example, the LSTM neural network may be trained using famous poems or prose (e.g., Shakespeare work). Based on one or more parameters (e.g., a seed value and a temperature value), the LSTM neural network may be trained to generate a poem or a prose that imitates the style of the work used as training data. As such, the session transfer system may use the integers from the converted data as the seed value and the temperature value to generate a new poem. The session transfer system may use the rest of the integers to select words from the generated poem as the code. In some embodiments, the session transfer system may hash the selected words and store the data (e.g., the cart data, the session data, etc.) to be associated with the hashed words within the session transfer system.

In some embodiments, the session transfer system may encode the data into a sequence of emoji icons. For example, the session transfer system may convert the data (e.g., shopping cart data and session data, etc.) into a sequence of numbers. The session transfer system may identify an emoji icon that corresponds to each number in the sequence of numbers. In some embodiments, the session transfer system may divide each number in the sequence of numbers by 10, and then using the digit(s) before the decimal point of the resulting number as an x coordinate and the digit(s) after the decimal point of the resulting number as a y coordinate for locating a corresponding emoji icon from an emoji chart (e.g., an emoji.json chart).

In some embodiments, the session transfer system may encode the data into a QR code, a color QR code, or an animated QR code. For example, the session transfer system may encode the binary numbers associated with the data into different pixels within a QR code.

In some embodiments, the session transfer system may embed the data into multiple different facial features that are recognizable by a computer-based facial recognition model. For example, a typical facial recognition algorithm may use 128 different features (e.g., parameters) for recognizing faces. The session transfer system may then embed the data into 128 or less parameters and generate an artificially generated face based on the parameters that embeds the data.

In some embodiments, the session transfer system may encode the data into an image. For example, the session transfer system may encode bits of the data into pixel values within the image. In another example, the session transfer system may store a collection of images in a multiple-dimension array (e.g., 100×100). The session transfer system may first convert the data into a sequence of integers, and then use the sequence of integers as coordinates to identify a corresponding image.

The code is designed to enable the user to easily transfer from the first device to the second device. For example, the various forms of QR code, the computer-generated face, and the image can be easily presented by the first device as an image and captured by a camera of the second device. A short string of characters or a short phrase can be easily memorized by the user after presenting the code on the first device. The user may then input the code on the second device.

In some embodiments, the session transfer system may select, from the different encoding techniques described herein, a particular encoding technique to encode the data based on (1) a size of the data (e.g., a number of different items in the electronic shopping cart) and/or (2) characteristics of the first device. Since the different encoding techniques have different limits in terms of a size of the data being encoded, the session transfer system of some embodiments may select an encoding technique based on a number of items added to the electronic shopping cart. For example, since a short string of characters can only hold a limited amount of data, the session transfer system may select to encode the data into a short string of characters when the number of items in the electronic shopping cart is within a first range (e.g., 0-2 items). A short phrase or an emoji string may include more data than a short string of characters, thus, the session transfer system may select to encode the data into a short phrase or an emoji string when the number of items in the electronic shopping cart is within a second range (e.g., 3-5 items). Similarly, the session transfer system may select to encode the data into a QR code when the number of items in the electronic shopping cart is within a third range (e.g., 6-10 items), select to encode the data into a color QR code when the number of items in the electronic shopping cart is within a fourth range (e.g., 11-20 items), select to encode the data into an animated QR code when the number of items in the electronic shopping cart is within a fifth range (e.g., 21-30 items), select to encode the data into an animated QR code when the number of items in the electronic shopping cart is within a fifth range (e.g., 21-30 items), select to encode the data into a computer-generated face when the number of items in the electronic shopping cart is within a sixth range (e.g., 31-500 items), and select to encode the data into an image when the number of items in the electronic shopping cart is within a seventh range (e.g., above 500 items).

In some embodiments, the session transfer system may also determine the characteristics of the first device, and select an encoding technique based on the characteristics of the first device. For example, if the first device has a small display with resolution below a threshold, the session transfer system may select an encoding technique that requires low resolution for presenting (e.g., a string of character, an emoji string, a short phrase, etc.). In another example, if the first device is a non-mobile device (e.g., a desktop computer, etc.), the session transfer system may select an encoding technique that requires a camera of the second device to capture the code (e.g., a QR code, an image, a face, etc.) as the second device is more likely to be a mobile device. Conversely, if the first device is a mobile device (e.g., a smart phone, a tablet, etc.), the session transfer system may select an encoding technique that does not require a camera of the second device to capture the code (e.g., a string of characters, an emoji string, a short phrase, etc.) as the second device is more likely to be a non-mobile device.

After encoding the data (e.g., the data related to the electronic shopping cart, the session data, etc.) into the code using the selected encoding technique, the session transfer system may present the code on the first device. In some embodiments, the session transfer system may present the code on the checkout webpage of the merchant website displayed on the first device. In some embodiments, the session transfer system may present the code as a popup window on the first device.

The user may input the code in the second device. For example, the session transfer system may provide a user interface on the second device for inputting the code. In some embodiments, the session transfer system may provide a session transfer webpage or an interface of a mobile application (e.g., a payment application), and the user may access the session transfer webpage or by initiating the mobile application to access the interface for inputting the code. The user interface provided by the session transfer system may include an area (e.g., an input field) that enables the user to input the code. When the code can be inputted using a keyboard, the user may type the code (e.g., the string of characters, the short phrase, the emoji, etc.) into the input field. When the code requires a camera to capture, the user may turn on a camera (e.g., enabling the camera by selecting a camera element on the user interface) and may capture the code using the camera.

Accordingly, the session transfer system may receive the code inputted on the second device. Upon receiving the code, the session transfer system may decode the code to extract the data (e.g., electronic shopping cart data, session data, etc.) associated with the electronic shopping cart and the browsing session from the first device. For example, if the code includes a string of characters or an emoji string, the session transfer system may translate the code into a sequence of numbers (e.g., using ASCII code), and the convert the sequence of numbers back to the data. If the code includes a short phrase, the session transfer system may hash the short phrase and use the hashed value to retrieve the data.

If the code includes a QR code or an image, the session transfer system may extract the data from the pixels of the QR code (e.g., 1 or 0 for each pixel) or the image (e.g., a color value in each pixel). If the code includes a face, the session transfer system may use a facial recognition algorithm to extract features (and parameters associated with the features) from the face, and convert the parameters into the data.

Once the session transfer system has obtained the data, the session transfer system may establish a browsing session between a browser application of the second device and the merchant server. In some embodiments, the session transfer system may establish the browsing session based on the session data included in the code, such that the browsing session inherits the characteristics of the browsing session between the merchant server and the first device. For example, since the session data includes a history of the webpages associated with the merchant website that the user has visited via the first device, the browsing session established between the merchant server and the second device may enable the user to traverse (e.g., using the back and forward buttons in the browser application) the historic webpages visited by the user. Furthermore, the session data may also enable the merchant server to present data that is customized to the user based on the session data (e.g., product recommendations, etc.).

In some embodiments, the session transfer system may re-create, within the browsing session between the merchant server and the second device, the electronic shopping cart based on the data from the code. The re-created electronic shopping cart may include the same one or more items and quantities as the electronic shopping cart generated by the user on the first device. In some embodiments, the re-created electronic cart may also include the same unique cart identifier as the electronic shopping cart generated on the first device. Thus, from the perspective of the merchant server, the electronic shopping cart re-created on the second device is identical to the electronic shopping cart on the first device. The manner in which the electronic shopping cart is migrated from the first device to the second device using techniques described herein enables the user to continue the browsing session seamlessly without interruption from the first device to the second device as if the user has been interacting with the merchant website using the second device all along.

The user may then initiate a checkout process by selecting a checkout button on the merchant website displayed on the second device. Since the second device is a trusted device, the user may comfortably input financial data, personal data, and/or credential data on the second device for the merchant server to complete the online purchase transaction. Another advantage is the user is now able to more quickly and efficiently complete, on the second device, a transaction started on the first device for any number of reasons, including a loss of connectivity or low power level.

In some embodiments, after receiving the code from the second device, the session transfer system may terminate the browsing session between the merchant server and the first device such that the browsing session and the electronic shopping cart may no longer be accessible via the first device (e.g., by the user or another user). Furthermore, the session transfer system may remove any data associated with the browsing session and/or the electronic shopping cart (e.g., cookies) from the first device.

FIG. 1 illustrates an electronic transaction system 100, within which the session transfer system may be implemented according to one embodiment of the disclosure. The electronic transaction system 100 includes a service provider server 130, a merchant server 120, a device 180, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each one of the device 180 and the user device 110, in one embodiment, may be utilized by a user 140 to interact with the merchant server 120, and/or the service provider server 130 over the network 160. For example, the user 140 may use the device 180 and/or the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. Each of the device 180 and the user device 110, in various embodiments, may be implemented using any appropriate combination of hardware and/or software configured for wired and/or wireless communication over the network 160. In various implementations, the device 180 and/or the user device 110 may include at least one of a wireless cellular phone, wearable computing device, PC, laptop, etc.

The user device 110, in one embodiment, includes a user interface application 112 (e.g., a web browser, a mobile payment application, etc.), which may be utilized by the user 140 to conduct electronic transactions (e.g., online payment transactions, etc.) with the merchant server 120, and/or the service provider server 130 over the network 160. In one aspect, purchase expenses may be directly and/or automatically debited from an account related to the user 140 via the user interface application 112.

In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one user identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, when the a transaction checkout webpage associated with any one of the merchant server 120 (that includes a group of website elements, such as links to different service provider servers including the service provider server 130) is presented on the user interface application 112 of the user device 110, the user 140 may use the input component to provide a selection of any one of the website elements presented on the transaction checkout webpage. Furthermore, the user 140 may also use the input component to provide user information with a transaction request, such as a login request, a fund transfer request, a request for adding an additional funding source (e.g., a new credit card), or other types of request. The user information may include user identification information.

In some embodiments, the device 180 is similar to the user device 110 and may have all or some of the components included within the user device 110. As such, the user 140 may also use the device 180 to interact with and perform transactions with the merchant server 120 and/or the service provider server 130 in a similar manner as the user 140 would with the user device 110.

The merchant server 120, in various embodiments, may be maintained by a business entity (or in some cases, by a partner of a business entity that processes transactions on behalf of business entity). Examples of business entities include merchant sites, resource information sites, utility sites, real estate management sites, social networking sites, etc., which offer various items for purchase and process payments for the purchases. The merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

A merchant may also use the merchant server 120 to communicate with the service provider server 130 over the network 160. For example, the merchant may use the merchant server 120 to communicate with the service provider server 130 in the course of various services offered by the service provider to a merchant, such as payment intermediary between customers of the merchant and the merchant itself. For example, the merchant server 120 may use an application programming interface (API) that allows it to offer sale of goods or services in which customers are allowed to make payment through the service provider server 130, while the user 140 may have an account with the service provider server 130 that allows the user 140 to use the service provider server 130 for making payments to merchants that allow use of authentication, authorization, and payment services of the service provider as a payment intermediary. In one example, the marketplace application 122 may include an interface server (e.g., a web server, a mobile application server, etc.) that provides an interface (e.g., a webpage) for the user 140 to interact with the merchant server 120. The merchant website hosted by the merchant server 120 may include a home webpage, many different product webpages related to different products, and a transaction checkout webpage, which may include webpage elements (e.g., links, etc.) for initiating payment services with the service provider server 130 and possibly other service providers. The user 140 who initiates a checkout process with the merchant server 120 may be presented with such a transaction checkout webpage, through which the user 140 may select a payment method with any one of the payment service providers (e.g., via selecting one of the webpage elements on the webpage). The merchant website may then prompt the user for additional information, such as funding account information, shipping information, and/or credential information to complete the online purchase transaction. The merchant may also have an account with the service provider server 130.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a session transfer module 132 that implements the session transfer system as discussed herein. The session transfer module 132 is configured to facilitate migration of an electronic shopping cart from a first device that was used to generate the electronic shopping cart to a second device. In some embodiments, the session transfer module 132 may detect that a browsing session has been established between a device (e.g., the device 180) and a merchant website (e.g., the merchant website hosted by the merchant server 120). For example, a user (e.g., the user 140) may use a browser application on the device 180 to access the merchant website. During the browsing session, the user 140 may select and add one or more items to an electronic shopping cart associated with the merchant website. In some embodiments, upon detecting the browsing session, the session transfer module 132 may provide, on the merchant website (e.g., a checkout webpage, a tool bar, etc.) displayed on the device 180, a session transfer selectable element that enables the user 140 to initiate a migration of the electronic shopping cart from the device 180 to another device (e.g., the user device 110).

When the session transfer module 132 receives an indication of a selection of the session transfer selectable element, the session transfer module 132 may retrieve, from the merchant website, data such as cart data associated with the electronic shopping cart and session data associated with the browsing session. The session transfer module 132 may encode the data into a code and cause the device 180 to present the code. The user 140 may then input the code on the user device 110 (e.g., type in the code, capture an image of the code using a camera of the user device 110) and submit the code to the session transfer module 132. Upon receiving the code from the user device 110, the session transfer module 132 may extract the data from the code, and regenerate the electronic shopping cart for the user 140. The session transfer module 132 may establish a new browsing session between the user device 110 and the merchant server 120 based on the session data from the code such that the user 140 may interact with the merchant website as if the user 140 has been interacting with the merchant website using the user device 110 all along. The user 140 may also initiate a checkout process using the user device 110 based on the re-generated electronic shopping cart.

Figure 2:
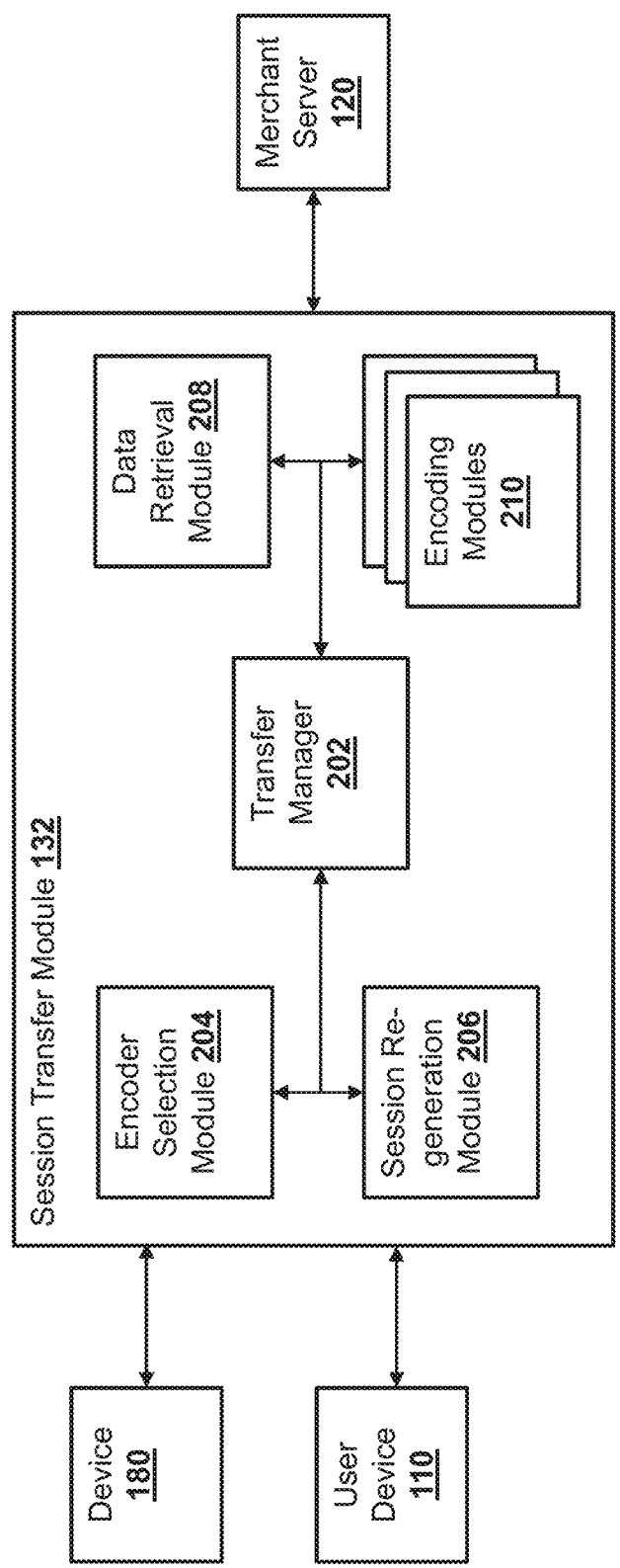
FIG. 2 is a block diagram illustrating a session transfer module according to an embodiment of the present disclosure.

FIG. 2 illustrates a block diagram of the session transfer module 132 according to an embodiment of the disclosure. The session transfer module 132 includes a transfer manager 202, an encoder selection module 204, a session re-generation module 206, a data retrieval module 208, and one or more encoding modules 210. In some embodiments, the transfer manager 202 may detect that a browsing session has been established between a device (e.g., the device 180) and the merchant server 120. For example, when the user 140 uses the device 180 (e.g., a browser application of the device 180) to access a merchant website hosted by the merchant server 120, the merchant server 120 may establish a browsing session between the device 180 and the merchant server 120. The browsing session includes session data that persists throughout the user 140's interactions with the merchant website, until the browsing session is terminated. The merchant server 120 may terminate the browsing session upon a termination condition, which may include the user closing a window that displays the merchant website, the user exiting out the browser application that renders the merchant website, a completion of an online purchase transaction associated with the browsing session, the merchant server 120 losing connection with the device 180, such as due to a loss of connectivity through the network 160, including loss of power of device 180, and the merchant website has timed out due to inactivity for a predetermined amount of time. In some embodiments, the session transfer module 132 may provide a plug-in installed on the browser application of the device 180 for detecting the browsing session with the merchant server. In some embodiments, the session transfer module 132 may provide a software module within the merchant website for detecting browsing sessions established with any devices.

During the browsing session, the merchant server 120 may monitor and store data associated with the user 140's interaction with the merchant website, which may include one or more webpages that the user 140 has accessed within the merchant website, a duration in which the user 140 views the one or more webpages, the user 140's selection of one or more selectable elements (e.g., links, photos, etc.), product preferences that the user 140 has provided on the merchant website (e.g., sizes, colors, styles, etc.), shipping preferences that the user 140 has provided on the merchant website, etc. In some embodiments, the merchant website also provides an electronic shopping cart for storing items that the user 140 desires to purchase during the browsing session. Thus, the user 140 may select and add one or more products to the electronic shopping cart associated with the merchant website during the browsing session.

Figure 3:
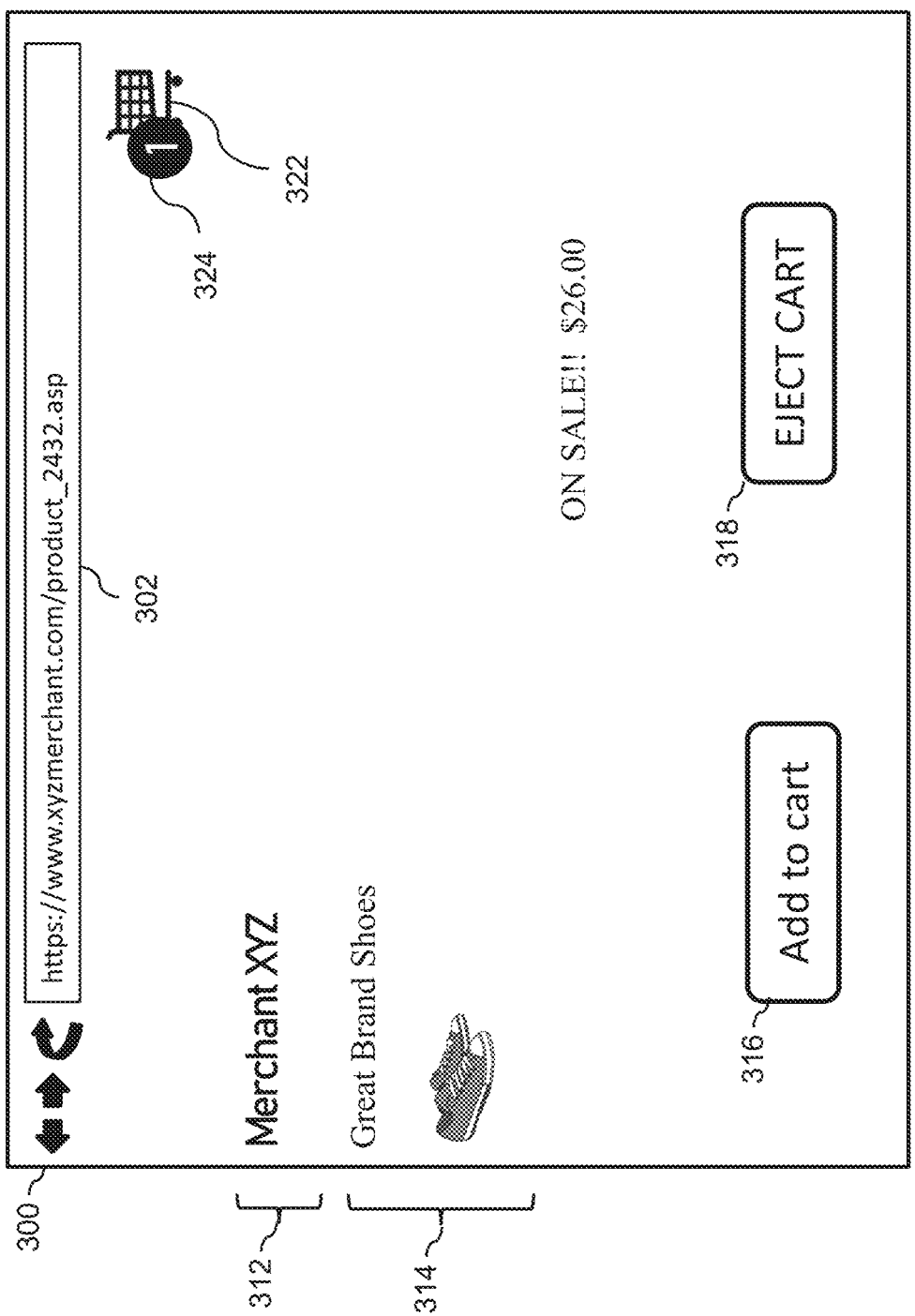
FIG. 3 illustrates an exemplary product webpage within a merchant website according to an embodiment of the present disclosure.

FIG. 3 illustrates an example product webpage 300 associated with the merchant website provided by the merchant server 120. The product webpage 300 is associated with a uniform resource locator (URL) address 302 "https://www.xyzmerchant.com/product_2432.asp". The product webpage 300 includes a section 312 for displaying a name of the merchant "XYZ Merchant", a section 314 for displaying information associated with a particular product offered for sale on the merchant website. In this example, the particular product offered for sale is a pair of shoes. The section 314 include a description of the product, an image of the product, and a price of the product. As shown in FIG. 3, the product webpage 300 also includes a shopping cart icon 322. The item indicator 324 indicates a number of items currently included in the electronic shopping cart. In this example, the item indicator 324 indicates that the electronic shopping cart currently includes 1 item. In some embodiments, the shopping cart icon 322 may be implemented as a link that can direct the user 140 to another webpage of the merchant website that displays information associated with the electronic shopping cart (e.g., information about the one or more items in the electronic shopping cart, etc.). In some embodiments, the link associated with the shopping cart icon 322 is associated with a checkout webpage associated with the merchant website, which will be described in more detail below by reference to FIG. 4.

In some embodiments, the electronic shopping cart may be implemented as a software object having a particular data structure for storing information for the merchant website during the browsing session. The information stored within the electronic shopping cart object may include a cart identifier for identifying the electronic shopping cart. The information may also include data associated with one or more items selected by the user 140 to be included in the electronic shopping cart, such as names of the one or more items, identifiers (e.g., a product code) associated with the one or more items, a quantity of each of the one or more items, a price of each of the one or more items, and other information associated with the items. In some embodiments, the information stored within the electronic shopping cart may also include additional data such as policy data indicating a set of policies governing the sales of the one or more items included in the electronic shopping cart.

The product webpage 300 also includes an interface selectable element 316 (e.g., an "add to cart" button) for adding the particular product to the electronic shopping cart associated with the merchant website. The use 140 may add the particular product to the electronic shopping cart by selecting the "add to cart" button 316. In some embodiments, the electronic shopping cart is linked to a particular browsing session such that when the browsing session is terminated (e.g., based on a termination condition described herein), the merchant server 120 may discard the electronic shopping cart such that it is no longer accessible by the user 140 on the device 180.

In some embodiments, the session transfer module 132 may provide (or cause the merchant website to provide) a session transfer selectable element 318 (e.g., an "eject cart" button) on the product webpage 300 for enabling the user 140 to transfer the electronic shopping cart from the device 180 to another device. In some embodiments, the session transfer selectable element 318 may be implemented on a tool bar of the product webpage 300 such that the session transfer selectable element 318 may appear on different webpages associated with the merchant website. By selecting the session transfer selectable element 318, the user 140 may initiate a process to migrate the electronic shopping cart from the device 180 to another device. Operations of the electronic shopping cart migration will be described in more detail below.

After adding one or more items to the electronic shopping cart, the user 140 may continue to browse the merchant website to view other webpages (e.g., other product webpages). The electronic shopping cart holds information associated with the one or more items selected by the user 140 until the user 140 is ready to checkout. When the user 140 is ready to checkout, the user 140 may initiate a checkout process via an interface element provided on the merchant website (e.g., selecting a checkout button on the merchant website), the merchant server 120 may present, on the device 180, a checkout webpage. The checkout webpage may present a summary of the items in the electronic shopping cart and payment options for paying for the online purchase transaction.

Figure 4:
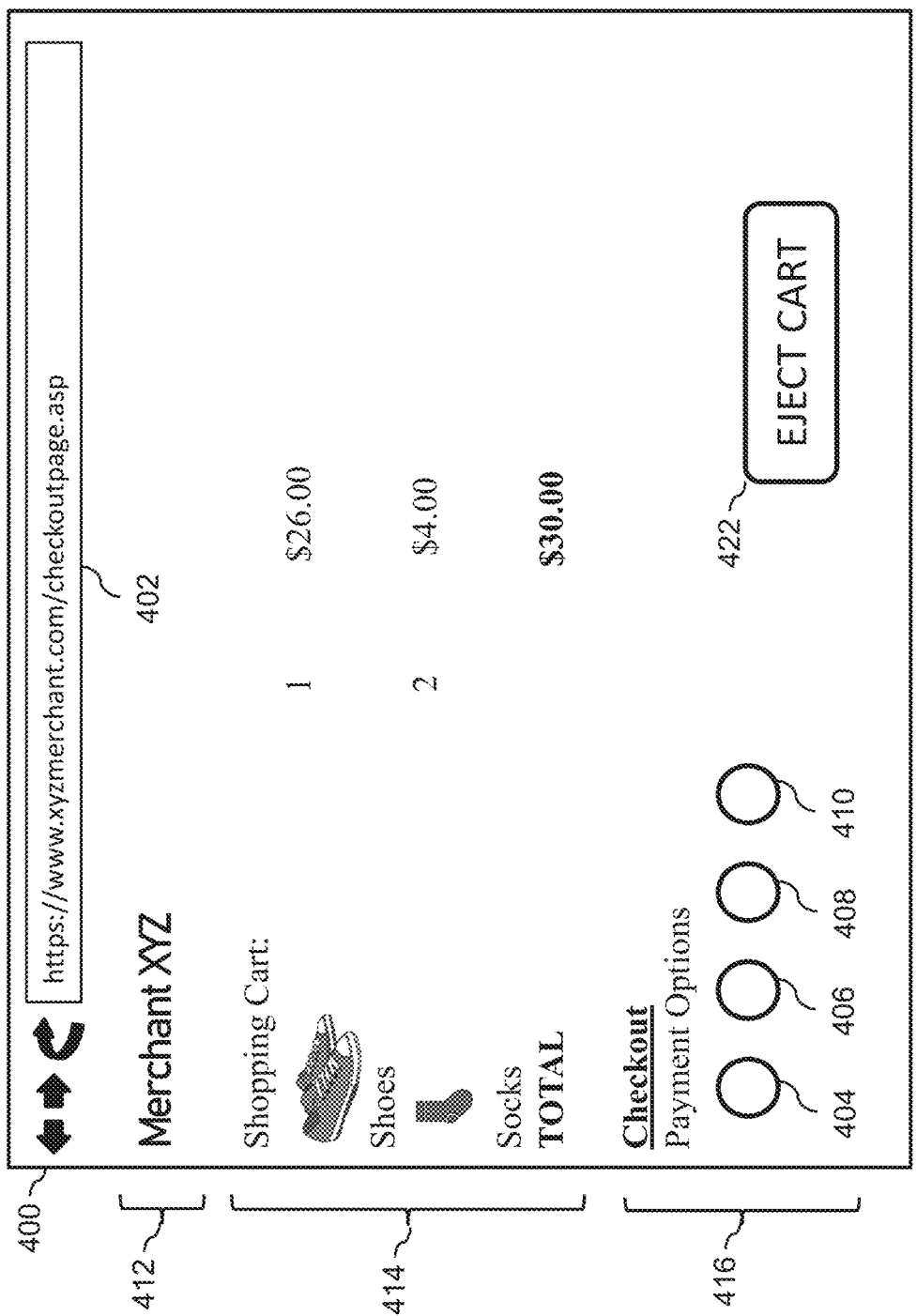
FIG. 4 illustrates an exemplary checkout webpage within the merchant website according to an embodiment of the present disclosure.

FIG. 4 illustrates an example of a checkout webpage 400 provided by the merchant server 120 as part of the merchant website. After the user 140 has initiated the checkout process (e.g., by selecting the shopping cart icon 322 on the product webpage 300, etc.), the merchant server 120 may direct the browser application of the device 180 to the checkout webpage 400. The checkout webpage 400 is associated with a URL 402 "https://www.xyzmerchant.com/checkoutpage.asp". As shown, the checkout webpage 400 includes a section 412 that displays the name of the merchant "Merchant XYZ". The checkout webpage 400 also includes a section 414 that displays a summary of the items in the electronic shopping cart. In this example, the section 414 indicates that the electronic shopping cart includes a pair of shoes that costs $26.00 and two pairs of socks that cost $4.00. The checkout webpage 400 also includes a section 416 that displays a list of payment options 404-410. For example, the list of payment options 404-410 may include a payment option using a third-party payment provider such as PAYPAL®, a payment option using a VISA® credit card, a payment option using a MASTERCARD® credit card, and a payment option using an AMERICAN EXPRESS® credit card. If the user 140 selects any one of the payment options 404-410, the merchant website may prompt the user for additional information for completing an online purchase transaction based on the items in the electronic shopping cart. The additional information may include funding account information (e.g., a credit card number, etc.), personal information (e.g., a billing address, a shipping address, etc.), and/or credential information (e.g., a user name, a password for logging the user 140 in to an account with the third-party payment provider, etc.).

As described herein, after generating the electronic shopping cart on the device 180, the user 140 may not want to complete the online purchase transaction on the device 180. For example, the device 180 may be an untrusted device such as a device shared with different people (e.g., a public computer in a library, etc.) or a device that is under the control of another person (e.g., a device borrowed from another person). Instead, the user 140 may desire to complete the online purchase transaction with another device (e.g., the user device 110). The user device 110 may be a trusted device such as a device owned or otherwise under the control of the user 140. The user device 110 may also include a digital wallet application that may assist the user 140 in providing financial information to the merchant securely.

As such, according to various embodiments of the disclosure, the session transfer module 132 may provide, on the checkout webpage 400, a session transfer selectable element 422 (similar to the session transfer selectable element 318 displayed on the product webpage 300) for initiating a migration of the electronic shopping cart from the device 180 to another device. Upon receiving an indication that the user 140 has selected the session transfer selectable element 422 (or the session transfer selectable element 318), the transfer manager 202 may use the data retrieval module 208 to obtain data from the merchant website and/or the merchant server 120. In some embodiments, the data retrieval module 208 may retrieve cart data associated with the electronic shopping cart from the merchant website. The cart data may be stored on the device 180 and/or the merchant server 120. Thus, the data retrieval module 208 may retrieve the cart data from the device 180 and/or the merchant server 120.

In some embodiments, the data retrieval module 208 may also retrieve session data associated with the browsing session between the device 180 and the merchant server 120 that is linked to the electronic shopping cart. As described herein, the merchant server 120 monitors and stores session data associated with the user 140's interaction with the merchant website, which may include one or more webpages that the user 140 has accessed within the merchant website, a duration in which the user 140 views the one or more webpages, the user 140's selection of one or more selectable elements (e.g., links, photos, etc.), product preferences that the user 140 has provided on the merchant website (e.g., sizes, colors, styles, etc.), shipping preferences that the user 140 has provided on the merchant website, etc. The data retrieval module 208 may obtain the session data from the merchant server 120.

The transfer manager 202 may then encode the cart data and the session data into a code using an encoding technique. In some embodiments, the session transfer module 132 may include multiple encoding modules 210 corresponding to different encoding techniques. For example, one encoding module may be configured to encode the data into a string of characters (e.g., a short phrase). For example, the encoding module may convert the data (e.g., shopping cart data and session data, etc.) into a sequence of numbers (e.g., integers), for example, by converting binary data into a base 10 number. The encoding module may then convert the sequence of numbers into a sequence of letters. In some embodiments, the sequence of numbers may be converted into the sequence of letters based on ASCII coding (e.g., reverse ASCII coding). In some embodiments, the encoding module may generate a short phrase based on the sequence of numbers (or the sequence of letters) using a long short term memory (LSTM) neural network. For example, the LSTM neural network may be trained using famous poems or prose (e.g., Shakespeare work). Based on one or more parameters (e.g., a seed value and a temperature value), the LSTM neural network may be trained to generate a poem or a prose that imitate the style of the work used as training data. As such, the encoding module may use the integers from the converted data as the seed value and the temperature value to generate a new poem. The encoding module may use the rest of the integers to select words from the generated poem as the code. In some embodiments, the encoding module may hash the selected words and store the data (e.g., the cart data, the session data, etc.) to be associated with the hashed words within the session transfer module 132.

Another encoding module may be configured to encode the data into a sequence of emoji icons. For example, the encoding module may convert the data (e.g., shopping cart data and session data, etc.) into a sequence of numbers (e.g., integers). The encoding module may identify an emoji icon that corresponds to each number in the sequence of numbers. In some embodiments, the encoding module may divide each number in the sequence of numbers by 10, and then using the digit(s) before the decimal point of the resulting number as an x coordinate and the digit(s) after the decimal point of the resulting number as a y coordinate for locating a corresponding emoji icon from an emoji chart (e.g., an emoji.json chart).

In some embodiments, the encoding module may use a machine learning model that selects one or more emojis for representing an aspect of the electronic shopping cart, such as an item within the shopping cart. For example, the encoding module may provide the machine learning model a name or a description of the item. The machine learning model may output an emoji and a confidence score based on the input name or description. The confidence score represents a confidence level that the emoji represents the product. The encoding module may use the emoji selected by the machine learning model to encode the electronic shopping cart if the confidence level is above a threshold (e.g., 95%).

Another encoding module may be configured to encode the data into a QR code, a color QR code, or an animated QR code. For example, the encoding module may encode the binary numbers associated with the data into different pixels within a QR code.

Another encoding module may be configured to embed the data into multiple different facial features that are recognizable by a computer-based facial recognition model. For example, a typical facial recognition algorithm may use 128 different features (e.g., parameters) for recognizing faces. The encoding module may then embed the data into 128 or less parameters and generate an artificially generated face based on the parameters.

Another encoding module may be configured to encode the data into an image. For example, the encoding module may encode the data, which is generally in the form of binary numbers, into pixel values within the image. In another example, the session transfer system may store a collection of images in a multiple-dimension array (e.g., 100×100). The session transfer system may first convert the data into a sequence of integers, and then use the sequence of integers as coordinates to identify a corresponding image based on the location of the image within the array.

Encoding the cart data and the session data into a code enables the user 140 to easily transfer the electronic shopping cart from the device 180 to the second device. For example, the various forms of QR code, the computer-generated face, and the image can be easily presented by the first device as an image and captured by a camera of the second device. A short string of characters or a short phrase can be easily memorized by the user after presenting the code on the first device and input the code on the second device.

The encoder selection module 204 may select one encoding module out of the different encoding modules 210 for encoding the cart data and the session data based on various factors, such as a size of the data or characteristics of the device 180 from which the electronic shopping cart will be exported. In some embodiments, the encoder selection module 204 may use the number of items in the electronic shopping cart to determine the size of the data. For example, since a short string of characters can only hold a small, limited amount of data, the encoder selection module 204 may select an encoding module configured to encode the data into a short string of characters when the number of items in the electronic shopping cart is within a first range (e.g., 0-2 items). A short phrase or an emoji string may include more data than a short string of characters, thus, the encoder selection module 204 may select an encoder module configured to encode the data into a short phrase or an emoji string when the number of items in the electronic shopping cart is within a second range (e.g., 3-5 items). Similarly, the encoder selection module 204 may select an encoder module configured to encode the data into a QR code when the number of items in the electronic shopping cart is within a third range (e.g., 6-10 items), select an encoder module configured to encode the data into a color QR code when the number of items in the electronic shopping cart is within a fourth range (e.g., 11-20 items), select an encoder module configured to encode the data into an animated QR code when the number of items in the electronic shopping cart is within a fifth range (e.g., 21-30 items), select an encoder module configured to encode the data into an animated QR code when the number of items in the electronic shopping cart is within a fifth range (e.g., 21-30 items), select an encoder module configured to encode the data into a computer-generated face when the number of items in the electronic shopping cart is within a sixth range (e.g., 31-500 items), and select an encoder module configured to encode the data into an image when the number of items in the electronic shopping cart is within a seventh range (e.g., above 500 items).

In some embodiments, the encoder selection module 204 may also determine the characteristics of the device 180, and select an encoder module based on the characteristics of the device 180. For example, if the device 180 has a small display with resolution below a threshold (500×500 pixels), the session transfer system may select an encoding module configured to generate a code that requires low resolution for presenting (e.g., a string of character, an emoji string, a short phrase, etc.). In another example, if the device 180 is a non-mobile device (e.g., a desktop computer, etc.), the encoder selection module 204 may select an encoding module configured to generate a code that requires a camera of the second device to capture the code (e.g., a QR code, an image, a face, etc.) as the other device that the user 140 wants to use to complete the online purchase transaction (e.g., the user device 110) is more likely to be a mobile device. Conversely, if the device 180 is a mobile device (e.g., a smart phone, a tablet, etc.), the encoder selection module 204 may select an encoder module configured to generate a code that does not require a camera of the other device to capture the code (e.g., a string of characters, an emoji string, a short phrase, etc.) as the other device is more likely to be a non-mobile device.

The transfer manager 202 may then use the encoder module selected by the encoder selection module 204 to encode the data (e.g., the cart data, the session data, etc.). The encoder module may use the corresponding encoding technique to generate a code based on the data (e.g., a short phrase, an emoji string, a QR code, an image of a face, etc.). The transfer manager 202 may present the code on the device 180. In some embodiments, the transfer manager 202 may present the code on a webpage associated with the merchant website, such that the user 140 is not being redirected away from the merchant website during the migration process.

Figure 5:
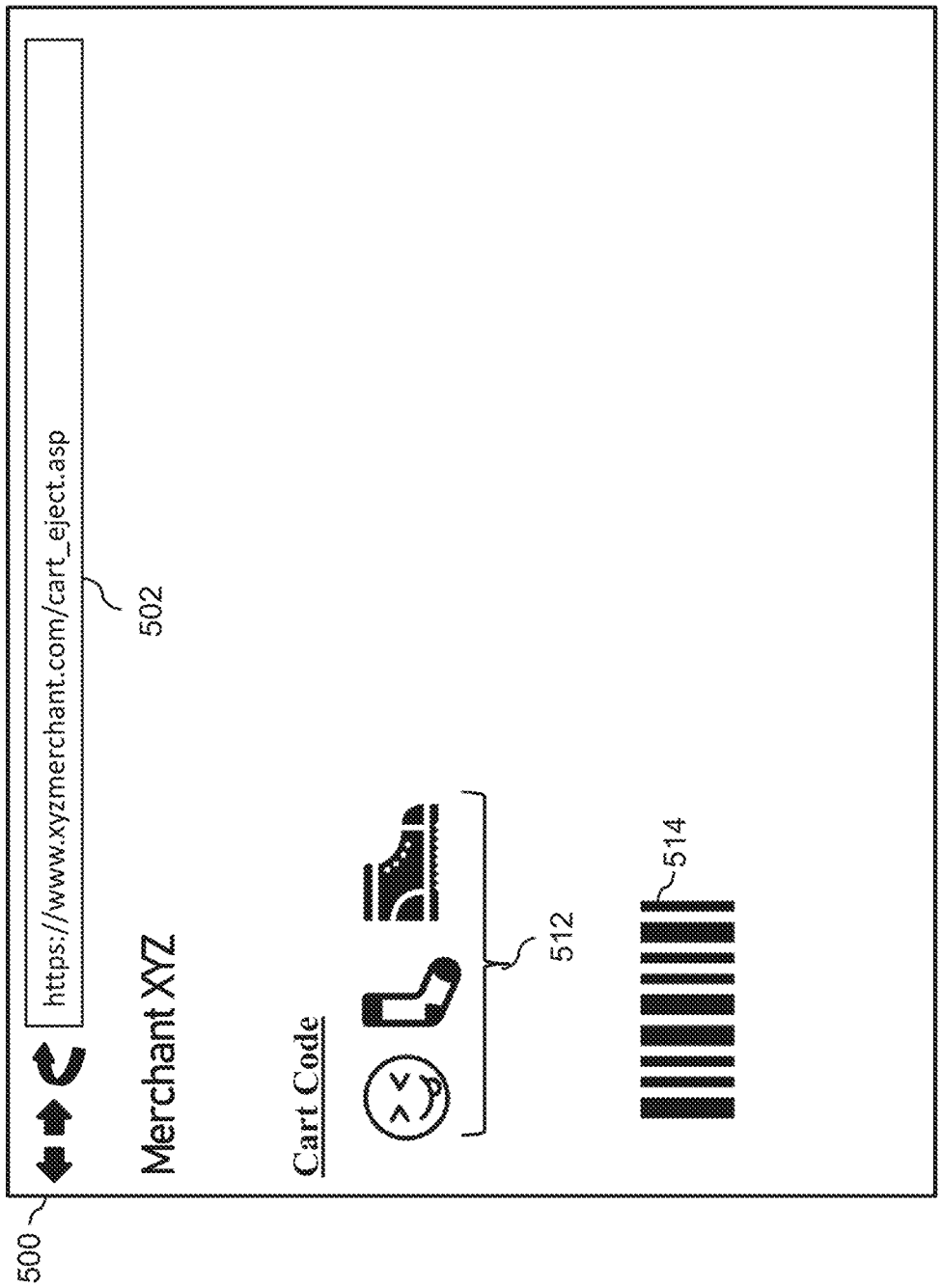
FIG. 5 illustrates an exemplary a shopping cart migration webpage within the merchant website according to an embodiment of the present disclosure.

FIG. 5 illustrates a webpage 500 for presenting the code to the user 140. In this example, the webpage is associated with the merchant website, as shown by its URL 502 "https://www.xyzmerchant.com/cart_eject.asp". The webpage 500 in this example illustrates two types of code generated by the encoding modules 210. As shown, an emoji string 512 and a code image (which can be a bar code, a QR code, a color QR code, or an animated QR code) are presented on the webpage 500. In some embodiments, the webpage 500 may also prompt the user 140 for inputting (or capturing) the code on the device (e.g., the user device 110) in which the user wants to complete the online purchase transaction.

The user 140 may access a migration interface provided by the session transfer module 132 using the user device 110. For example, the user 140 may use a browser application of the user device 110 to access a session migration webpage hosted by the service provider server 130. In another example, the user 140 may launch a mobile application associated with the service provider server 130 on the user device 110. When the transfer manager 202 receives a request from the user device 110 for the migration interface, the transfer manger 202 may provide the migration interface on the user device 110.

Figure 6:
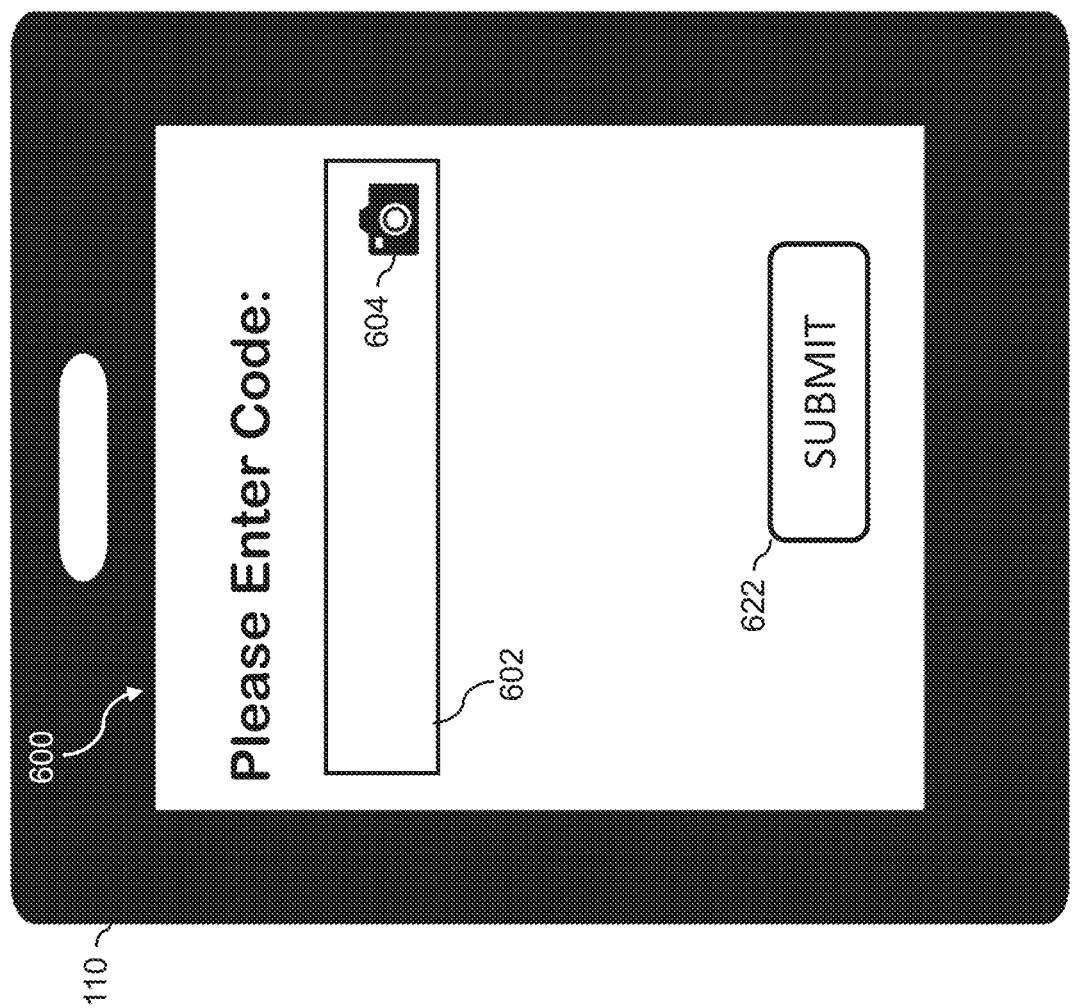
FIG. 6 illustrates an exemplary session migration interface according to an embodiment of the present disclosure.
Figure 6:
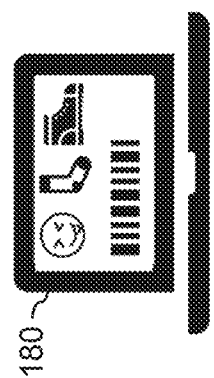

FIG. 6 illustrates an example migration interface 600 generated by the transfer manager 202 according to one embodiment of the disclosure. As shown in FIG. 6, the migration interface 600 is presented on the user device 110. The migration interface 600 includes a code input field 602 that enables the user 140 to input the code presented on the device 180 using an input means (e.g., a keyboard, a digital keyboard, etc.). The migration interface 600 also includes a camera button 604 for activating a camera (e.g., a back camera) of the user device 110 to capture the code. For example, when the code presented on the device 180 is an image (e.g., a QR code, an animated QR code, an image of a face, etc.), instead of manually inputting the code in the code input field 602, the user 140 may select the camera button 604 to activate the camera and capture the code presented on the device 180. The user 140 may submit the code to the session transfer module 132 by selecting the submit button 622.

The session transfer module 132 may receive the code inputted on the user device 110 after the user 140 selected the submit button 622. Upon receiving the code, the transfer manager 202 may detect a type of code and select a corresponding encoding module to decode the code. For example, if the transfer manager 202 detects that the code received from the user device 110 is a short phrase, the transfer manager 202 may select, from the encoding modules 210, an encoding module corresponding with short phrase encoding to decode the code. The encoding module may translate the code back into a sequence of numbers (e.g., using ASCII code), and the convert the sequence of numbers back to the data.

Similarly, if the transfer manager 202 detects that the code received from the user device 110 is a QR code, the transfer manager 202 may select, from the encoding modules 210, an encoding module corresponding with QR code encoding to decode the code. The encoding module may extract the data from the pixels of the QR code (e.g., 1 or 0 for each pixel). If the transfer manager 202 detects that the code received from the user device 110 is an image of a face, the transfer manager 202 may select, from the encoding modules 210, an encoding module corresponding with facial recognition to decode the image. The encoding module may use a facial recognition algorithm to extract features (and parameters associated with the features) from the face, and convert the parameters into the data.

Thus, the transfer manager 202 may use the corresponding encoding module to decode the code and to extract the data (e.g., electronic shopping cart data, session data, etc.) associated with the electronic shopping cart and the browsing session from the device 180. Once the transfer manager 202 has obtained the data, the session re-generation module 206 may establish a browsing session between a browser application of the user device 110 and the merchant server 120. In some embodiments, the session re-generation module 206 may establish the browsing session based on the session data included in the code, such that the browsing session inherits the characteristics (e.g., browsing history, interaction history of the user 140, etc.) of the browsing session between the merchant server 120 and the device 180. For example, since the session data includes a history of the webpages associated with the merchant website that the user 140 has visited via the device 180, the browsing session established between the merchant server 120 and the user device 110 may enable the user 140 to traverse (e.g., using the back and forward buttons of the browser application) the historic webpages. Furthermore, the session data may also enable the merchant server 120 to present content that is customized to the user based on the session data (e.g., product recommendations, etc.).

In some embodiments, the session re-generation module 206 may re-create, based on the cart data from the code, the electronic shopping cart within the browsing session between the merchant server 120 and the device 180 on the user device 110. The re-created electronic shopping cart may include the same cart identifier and the same one or more items and quantities as the electronic shopping cart generated by the user on the device 180. Thus, from the perspective of the merchant server 120, the electronic shopping cart re-created on the user device 110 is identical to the electronic shopping cart on the device 180. The manner in which the electronic shopping cart is migrated from the device 180 to the user device 110 using techniques described herein enables the user 140 to continue the browsing session seamlessly without interruption from the device 180 to the user device 110 as if the user has been interacting with the merchant website using the user device 110 all along.

Figure 7:
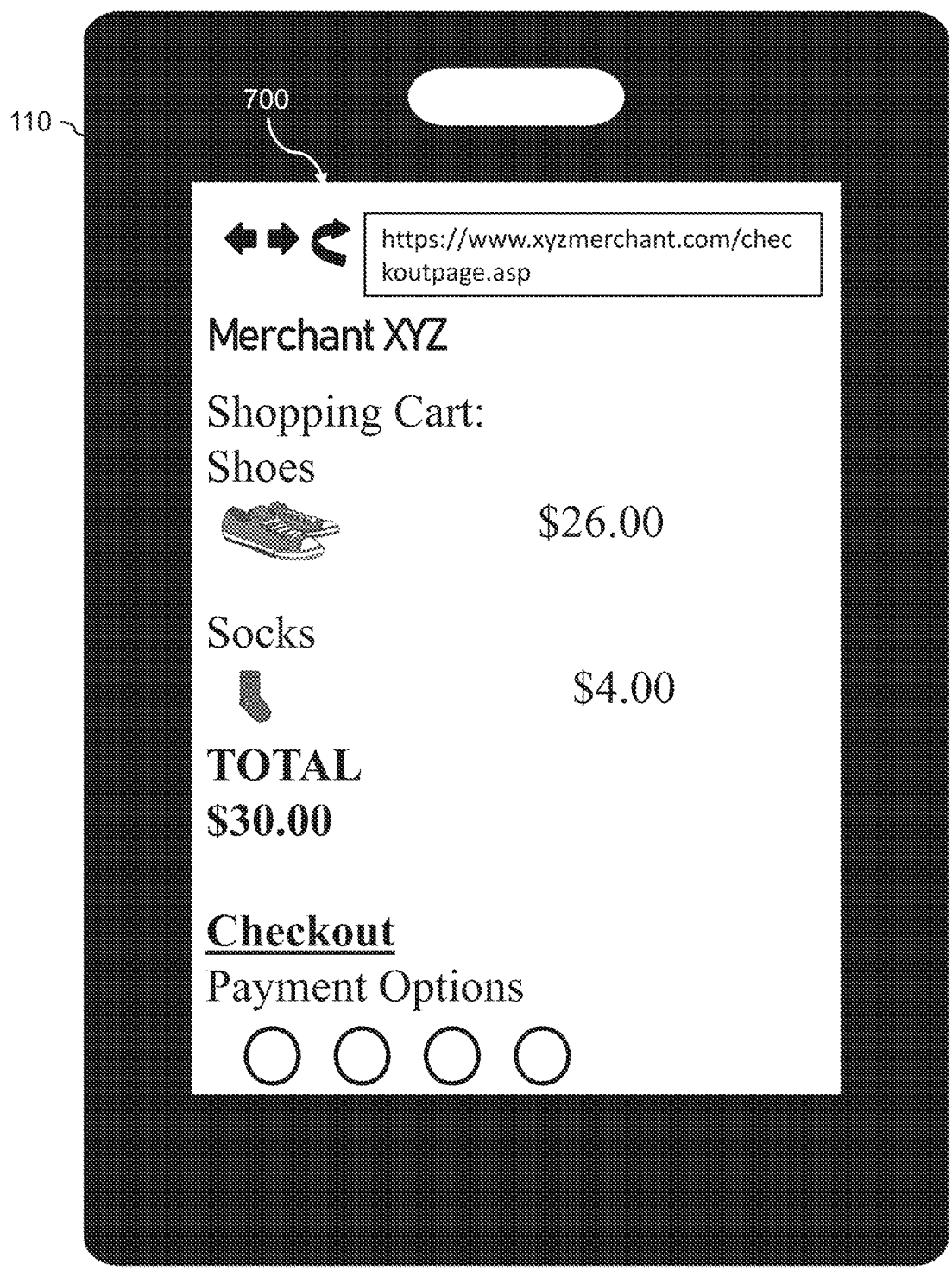
FIG. 7 illustrates an exemplary checkout webpage based on a re-created electronic shopping cart according to an embodiment of the present disclosure.

After establishing the browsing session between the user device 110 and the merchant server 120, the transfer manager 202 may cause the browser application of the user device 110 to present a webpage of the merchant website that displays the re-created electronic shopping cart based on the data extracted from the code. FIG. 7 illustrates a checkout webpage 700 displayed on the user device 110 after the user submitted the code using the migration interface 600. As shown, the checkout webpage 700 displayed on the user device 110 presents items from the re-created electronic shopping cart, which has the same items as the electronic shopping cart generated by the user 140 via the device 180. Similar to the checkout webpage 400, the checkout webpage 700 also includes a list of payment options for completing the online purchase transaction.

The user 140 may initiate the online purchase transaction by selecting any one of the payment options presented on the checkout webpage 700 displayed on the user device 110. Since the user device 110 is a trusted device, the user may comfortably input financial data, personal data, and/or credential data on the user device 110 for the merchant server 120 to complete the online purchase transaction. The merchant server 120 may complete the online purchase transaction based on the re-created electronic shopping cart and the data (e.g., financial data, personal data, and/or credential data) received from the user device 110. In some embodiments, the merchant server 120 may also use the session data (e.g., shipping method preferences, etc.) collected from the browsing session between the merchant server 120 and the device 180 to complete the online purchase transaction.

In some embodiments, after receiving the code from the user device 110, the transfer manager 202 may terminate the browsing session between the merchant server 120 and the device 180 such that the browsing session and the electronic shopping cart may no longer be accessible via the device 180 (e.g., by the user 140 or another user). Furthermore, the transfer manager 202 may remove any data associated with the browsing session and/or the electronic shopping cart (e.g., cookies) from the device 180.

Figure 8:
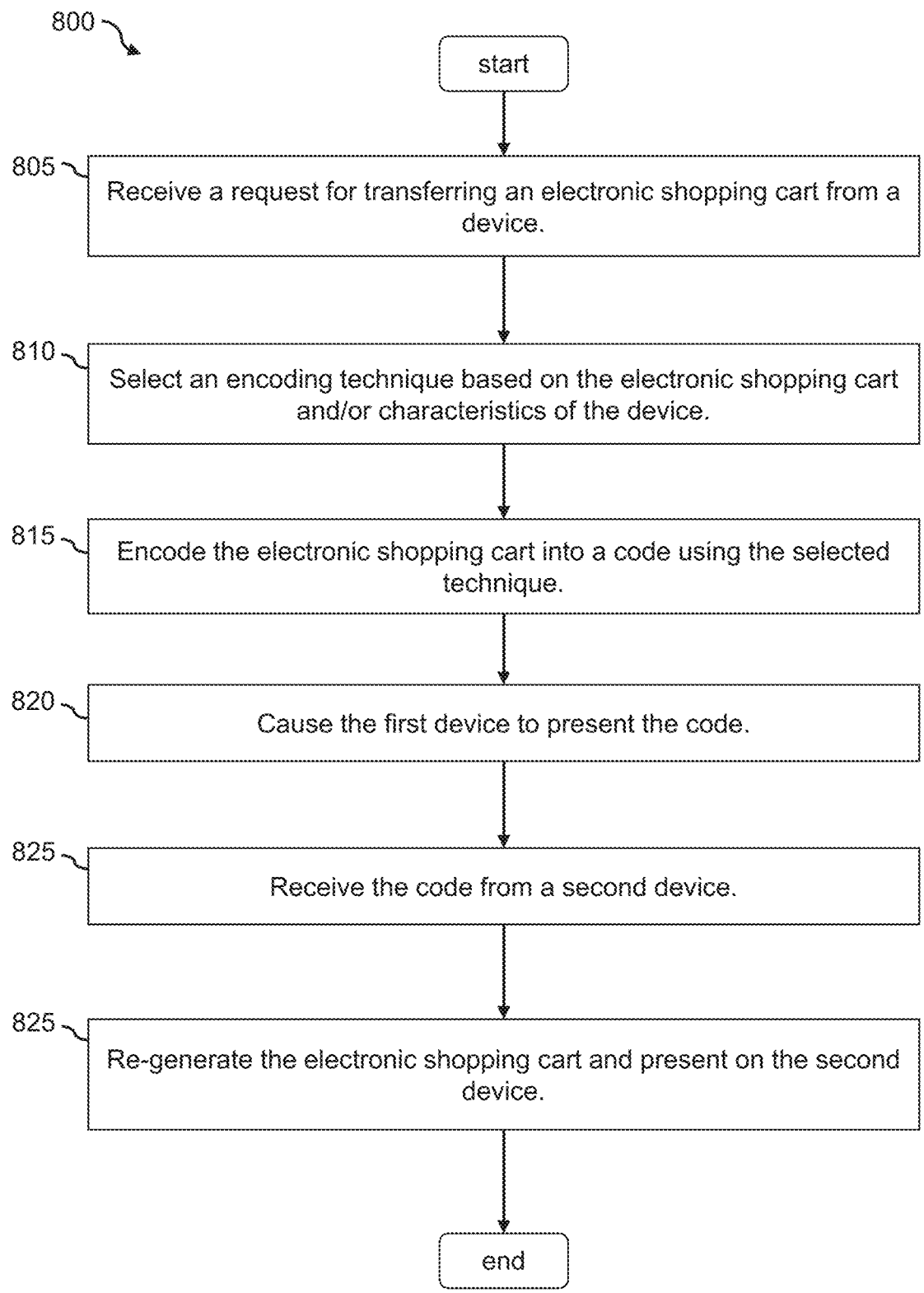
FIG. 8 is a flowchart showing a process of electronic shopping cart migration according to an embodiment of the present disclosure.

FIG. 8 illustrates a process 800 for facilitating migration of an electronic shopping cart according to various embodiments of the disclosure. In some embodiments, at least a portion of the process 800 may be performed by the session transfer module 132 of the service provider server 130. The process 800 begins by receiving (at step 805) a request for transferring an electronic shopping cart from a device. For example, the user 140 may use the device 180 to browse the merchant website hosted by the merchant server 120. While browsing the merchant website, the user 140 may select and add one or more items to an electronic shopping cart associated with the merchant website. In some embodiments, the transfer manager 202 may present a session transfer selectable element (e.g., a cart eject button) on the merchant website (e.g., the checkout page of the merchant website) displayed on the device 180 for exporting the electronic shopping cart from the device 180 to another device. The transfer manager 202 may receive a request for transferring the electronic shopping cart to another device when the user 140 selects the session transfer selectable element.

The process 800 then selects (at step 810) an encoding technique based on the electronic shopping cart and/or characteristics of the device. For example, the encoder selection module 204 may selects, from the encoding modules 210, a particular encoder module for encoding data associated with the electronic shopping cart generated via the device 180 based on the number of items included in the electronic shopping cart and/or characteristics of the device 180 (e.g., a screen resolution of the device 180, whether the device 180 is a mobile device, etc.).

After selecting an encoding technique, the process encodes (at step 815) the electronic shopping cart into a code using the selected technique and causes (at step 820) the first device to display the code. For example, the transfer manager 202 may use the selected encoding module to encode data, which may include cart data associated with the electronic shopping cart and session data associated with the browsing session between the device 180 and the merchant server 120, into a code. The transfer manager 202 may also present the code on the device 180, for example, on a webpage of the merchant website that is displayed on the device 180.

The process 800 then receives (at step 825) the code from a second device and re-generates (at step 830) the electronic shopping cart and presents it on the second device. For example, the transfer manager 202 may receive the code from the user device 110 (e.g., inputted by the user 140 on the user device 110 or captured by the user device 110). The transfer manager 202 may use a corresponding encoder module to extract the cart data and the session data from the code. The session re-generation module may establish a browsing session between the user device 110 and the merchant server 120 based on the session data extracted from the code and may re-create an electronic shopping cart based on the cart data. In some embodiments, the transfer manager 202 may present, on the user device 110, a webpage of the merchant website that displays content of the re-created electronic shopping cart. The user 140 may then initiate the online purchase transaction using the user device 110.

While the electronic shopping cart techniques has been illustrated in the above—examples for use in online purchase transactions, it has been contemplated that the techniques can also be used for other types of transactions, such as in-store transactions. For example, the user 140 may conduct an in-store transaction with a merchant at a physical store. The user 140 may ring up the items at a cashier associated with a point-of-sale (POS) device. In this example, the device 180 may be the POS device. The merchant may generate a shopping cart for the in-store transaction and displayed on the POS device. To complete the transaction, the user 140 may provide funding account information to the POS device, such as by swiping a credit card against a magnetic strip reader or inserting the credit card into an EMV reader. However, for reasons such as security, the user 140 may not desire to provide the funding account information to the POS device, and would prefer to complete the in-store transaction using the user's 140 mobile device (e.g., the user device 110). Thus, the transfer manager 202 may cause the POS device to present an option to transfer the shopping cart to another device. The user 140 may input or otherwise use the user device 110 to capture a code that is displayed on the POS device. The shopping cart is re-created on the user device 110, and the user 140 may complete the in-store purchase transaction via the user device 110, instead of the POS device.

Furthermore, once the user device 110 receives the code (by capturing the code via a camera of the user device 110 or from data input by the user 140), the user device 110 may transmit the code to one or more other devices to enable other devices to re-create the browsing session and the electronic shopping cart. For example, the user 140 (e.g., a child) may use the user device 110 to transmit the code to another device associated with a parent of the child, such that the parent of the child can use the other device to view the purchase transaction and perform the electronic payment transaction based on the electronic shopping cart using that other device.

FIG. 9 is a block diagram of a computer system 900 suitable for implementing one or more embodiments of the present disclosure, including the service provider server 130, the merchant server 120, the device 180, and the user device 110. In various implementations, each of the device 180 and the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 120, 130, and 180 may be implemented as the computer system 900 in a manner as follows.

The computer system 900 includes a bus 912 or other communication mechanism for communicating information data, signals, and information between various components of the computer system 900. The components include an input/output (I/O) component 904 that processes a user (i.e., sender, recipient, service provider) action, such as selecting keys from a keypad/keyboard, selecting one or more buttons or links, etc., and sends a corresponding signal to the bus 912. The I/O component 904 may also include an output component, such as a display 902 and a cursor control 908 (such as a keyboard, keypad, mouse, etc.). The display 902 may be configured to present a login page for logging into a user account or a checkout page for purchasing an item from a merchant. An optional audio input/output component 906 may also be included to allow a user to use voice for inputting information by converting audio signals. The audio I/O component 906 may allow the user to hear audio. A transceiver or network interface 920 transmits and receives signals between the computer system 900 and other devices, such as another user device, a merchant server, or a service provider server via network 922. In one embodiment, the transmission is wireless, although other transmission mediums and methods may also be suitable. A processor 914, which can be a micro-controller, digital signal processor (DSP), or other processing component, processes these various signals, such as for display on the computer system 900 or transmission to other devices via a communication link 924. The processor 914 may also control transmission of information, such as cookies or IP addresses, to other devices.

The components of the computer system 900 also include a system memory component 910 (e.g., RAM), a static storage component 916 (e.g., ROM), and/or a disk drive 918 (e.g., a solid-state drive, a hard drive). The computer system 900 performs specific operations by the processor 914 and other components by executing one or more sequences of instructions contained in the system memory component 910. For example, the processor 914 can perform the electronic shopping cart migration functionalities described herein according to the process 800.

Logic may be encoded in a computer readable medium, which may refer to any medium that participates in providing instructions to the processor 914 for execution. Such a medium may take many forms, including but not limited to, non-volatile media, volatile media, and transmission media. In various implementations, non-volatile media includes optical or magnetic disks, volatile media includes dynamic memory, such as the system memory component 910, and transmission media includes coaxial cables, copper wire, and fiber optics, including wires that comprise the bus 912. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 900. In various other embodiments of the present disclosure, a plurality of computer systems 900 coupled by the communication link 924 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to execute instructions from the non-transitory memory to cause the system to:
 detect that a checkout page of a merchant website is accessed by a browser of a first device during a first web session established between the merchant website and the first device, wherein the merchant website is hosted by a third-party server and comprises an electronic shopping cart generated based on one or more interactions between a user of the first device and the merchant website during the first web session;
 subsequent to the detecting, modify a presentation of the checkout page of the merchant website on the first device, wherein the modifying comprises inserting, on the presentation of the checkout page, a selectable element that enables migrating the electronic shopping cart;
 in response to receiving a selection of the selectable element via the browser, encode the first web session into a code based on session data associated with the first web session, wherein the session data represents the electronic shopping cart and a set of interactions between the user of the first device and the merchant website during the first web session;
 receive the code from a second device;
 cause the second device to establish a second web session between the second device and the merchant website based on the session data, wherein the session data associated with the first web session is incorporated into the second web session; and
 present, on the second device as part of the second web session, web content associated with the merchant website based on the session data, wherein the web content comprises cart data associated with the electronic shopping cart.

2. The system of claim 1, wherein the session data comprises a browsing history associated with the first web session, and wherein the presenting the web content comprises presenting a webpage associated with the merchant website based on the browsing history.

3. The system of claim 2, wherein the web content further comprises content data generated based on the browsing history associated with the first web session.

4. The system of claim 1, wherein the electronic shopping cart comprises shopping data associated with a product, and wherein the shopping data comprises a product identifier and a quantity.

5. The system of claim 1, wherein the selectable element is inserted on a tool bar of the merchant website.

6. The system of claim 1, wherein executing the instructions further comprise causes the system to:

generate the electronic shopping cart associated with the merchant website for the second web session.

7. The system of claim 6, wherein generating the electronic shopping cart comprises:

generating a computer software object having a predetermined data structure corresponding to the electronic shopping cart; and inserting data into the computer software object based on the session data associated with the first web session.

8. The system of claim 7, wherein the data represents at least one of a cart identifier associated with the electronic shopping cart, an item that has been added to the electronic shopping cart during the first web session, a quantity of the item that has been added to the electronic shopping cart, a price of the item, or a set of policies governing the sales of the item.

9. A non-transitory machine-readable medium having stored thereon machine-readable instructions executable to cause a machine to perform operations comprising:

detecting a particular interaction between a user of a first device and a merchant website hosted by a third-party server during a first web session established between the third-party server and the first device, wherein the particular interaction is related to an electronic shopping cart of the merchant website;

subsequent to the detecting, modifying a presentation of the merchant website on the first device, wherein the modifying comprises inserting, on the presentation of the merchant website, a selectable element that enables migrating the electronic shopping cart;

in response to receiving a selection of the selectable element, encoding the first web session into a code that represents session data related to the electronic shopping cart and a set of interactions between the user of the first device and the merchant website during the first web session;

receiving the code from a second device;

causing the second device to extract the session data from the code and to establish a second web session between the second device and the merchant website based on the extracted session data; and presenting, on the second device and as part of the second web session, web content associated with the merchant website according to the extracted session data, wherein the web content comprises cart data associated with the electronic shopping cart.

10. The non-transitory machine-readable medium of claim 9, wherein the extracted session data comprises a browsing history associated with the first web session, and wherein the presenting the web content comprises presenting a webpage associated with the merchant website based on the browsing history.

11. The non-transitory machine-readable medium of claim 9, wherein the extracted session data comprises a browsing history associated with the first web session, and wherein the web content includes customized data generated for a user of the first device based on the browsing history associated with the first web session.

12. The non-transitory machine-readable medium of claim 9, wherein the electronic shopping cart comprises shopping data associated with a set of products selected by the user of the first device during the first web session.

13. The non-transitory machine-readable medium of claim 12, wherein the operations further comprise:

causing the second device to generate the electronic shopping cart associated with the merchant website for the second web session.

14. The non-transitory machine-readable medium of claim 13, wherein the causing the second device to generate the electronic shopping cart comprises:

generating a computer software object having a predetermined data structure corresponding to the electronic shopping cart; and inserting data into the computer software object based on the session data associated with the first web session.

15. A method comprising:

detecting, by a computer system, an interaction between a user of a first device and a merchant website during a first web session established between the merchant website and the first device, wherein the interaction is related to an electronic shopping cart associated with the merchant website;

subsequent to the detecting, modifying a presentation of the merchant website on the first device, wherein the modifying comprises inserting, on the presentation of the merchant website, a selectable element that enables migrating the electronic shopping cart;

receiving, via a browser of the first device, a selection of the selectable element;

encoding the first web session into a code that represents session data related to the electronic shopping cart and a set of interactions between the user of the first device and the merchant website during the first web session;

receiving the code from a second device;

causing, by the computer system, the second device to extract the session data from the code and to establish a second web session between the second device and the merchant website based on the extracted session data; and presenting, on the second device and as part of the second web session, web content associated with the merchant website according to the extracted session data, wherein the web content comprises cart data associated with the electronic shopping cart.

16. The method of claim 15, wherein the session data comprises a browsing history associated with the first web session, and wherein the presenting the web content comprises presenting a webpage associated with the merchant website based on the browsing history.

17. The method of claim 15, wherein the extracted session data comprises a browsing history associated with the first web session, and wherein the web content includes customized data generated for a user of the first device based on the browsing history associated with the first web session.

18. The method of claim 15, wherein the electronic shopping cart comprises shopping data associated with a product selected by the user during the first web session.

19. The method of claim 18, further comprising:
  causing the second device to generate the electronic shopping cart associated with the website for the second web session.

20. The method of claim 19, wherein the causing the second device to generate the electronic shopping cart comprises:
  generating a computer software object having a predetermined data structure corresponding to the electronic shopping cart; and
  inserting data into the computer software object based on the session data associated with the first web session.

* * * * *